US012249796B2

(12) United States Patent
Lin et al.

(10) Patent No.: US 12,249,796 B2
(45) Date of Patent: Mar. 11, 2025

(54) ELECTRICAL CONNECTOR

(71) Applicant: Cheng Uei Precision Industry Co., LTD., New Taipei (TW)

(72) Inventors: Pei-Yi Lin, New Taipei (TW); Chuan-Hung Lin, New Taipei (TW); Sheng-Nan Yu, New Taipei (TW); Sheng-Yuan Huang, New Taipei (TW); Chun-Fu Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 404 days.

(21) Appl. No.: 17/970,555

(22) Filed: Oct. 20, 2022

(65) Prior Publication Data

US 2023/0283025 A1 Sep. 7, 2023

(30) Foreign Application Priority Data

Mar. 2, 2022 (CN) ......................... 202220452220.8

(51) Int. Cl.
*H01R 24/60* (2011.01)
*H01R 13/502* (2006.01)
*H01R 13/6581* (2011.01)

(52) U.S. Cl.
CPC ........... *H01R 24/60* (2013.01); *H01R 13/502* (2013.01); *H01R 13/6581* (2013.01); *H01R 2201/06* (2013.01)

(58) Field of Classification Search
CPC .. H01R 24/60; H01R 13/502; H01R 13/6581; H01R 2201/06
USPC .......................................................... 439/634
See application file for complete search history.

(56) References Cited

U.S. PATENT DOCUMENTS 9,917,391 B2 * 3/2018 Zhang .................... H01R 13/04
2007/0087629 A1 * 4/2007 Liang ................. H01R 13/6593 439/607.01
2010/0075542 A1 * 3/2010 Ho ..................... H01R 13/4367 439/660
2017/0352973 A1 * 12/2017 Zhang .................... H01R 24/60

FOREIGN PATENT DOCUMENTS

CN 201541015 U * 8/2010
CN 207098133 U * 3/2018
CN 209133725 U * 7/2019
CN 107465013 B * 11/2019 ............ H01R 13/02

(Continued)

*Primary Examiner* — Peter G Leigh
(74) *Attorney, Agent, or Firm* — Cheng-Ju Chiang

(57) ABSTRACT

An electrical connector includes an insulating body, a plurality of conductive terminals, a plurality of grounding terminals and two shielding elements. The plurality of the conductive terminals are mounted in the insulating body. The plurality of the grounding terminals are mounted in the insulating body. The plurality of the grounding terminals are located adjacent to two outer sides of the plurality of the conductive terminals. The two shielding elements are disposed at a front end of an upper surface and a front end of a lower surface of the insulating body. Each shielding element has a base frame. Two sides of a rear edge of the base frame are connected with two contact portions. The contact portions of the two shielding elements contact with the plurality of the grounding terminals.

16 Claims, 11 Drawing Sheets

(56) References Cited

FOREIGN PATENT DOCUMENTS

| | | | | |
|---|---|---|---|---|
| CN | 209981537 | U | * | 1/2020 |
| CN | 209981590 | U | * | 1/2020 |
| CN | 209981634 | U | * | 1/2020 |
| CN | 210723448 | U | * | 6/2020 |
| CN | 211404825 | U | * | 9/2020 |
| CN | 112688102 | A | * | 4/2021 |

* cited by examiner

ELECTRICAL CONNECTOR

CROSS-REFERENCE TO RELATED APPLICATION

The present application is based on, and claims priority from, China Patent Application No. 202220452220.8, filed Mar. 2, 2022, the disclosure of which is hereby incorporated by reference herein in its entirety.

BACKGROUND OF THE INVENTION

1. Field of the Invention

The present invention generally relates to an electrical connector, and more particularly to an electrical connector that is able to stabilize a high frequency transmission.

2. The Related Art

Nowadays, with the popularity of IoT (Internet of Things) devices and streaming platforms, high-speed transmission demands and lower interference requirements for the IoT devices and the streaming platforms are increased. In order to avoid a mechanical device of a conventional connecting system causing a signal loss or a speed reduction of the conventional connecting system, USB-IF (USB Implementers Forum) released the latest USB4 specification. Follow a USB (Universal Serial Bus) Type-C interface to carry a dual-channel mode, the highest transmission speed is able to reach up to 40 Gbps. However, in a high frequency band, a resonance point occurs, and the resonance point affects a terminal transmission stability.

Thus, it is necessary to provide an electrical connector, the electrical connector is able to achieve a sufficient signal transmission speed and achieve a low signal interference effect simultaneously, so the electrical connector is able to stabilize a high frequency transmission.

SUMMARY OF THE INVENTION

An object of the present invention is to provide an electrical connector that is able to stabilize a high frequency transmission. The electrical connector includes an insulating body, a plurality of conductive terminals, a plurality of grounding terminals and two shielding elements. A front end of the insulating body has an accommodating space penetrating through a front surface of the insulating body. A rear end of the insulating body has an assembling groove penetrating through a rear end of a top surface, a rear end of a bottom surface and a middle of a rear surface of the insulating body. The insulating body has an isolating wall formed between the accommodating space and the assembling groove. The isolating wall defines two rows of terminal slots along an up-down direction. Each terminal slot longitudinally penetrates through the isolating wall. The two rows of the terminal slots are communicated between the accommodating space and the assembling groove. The insulating body has a plurality of penetrating grooves respectively penetrating through two sides of the top surface and two sides of the bottom surface of the insulating body, and the plurality of the penetrating grooves extend to the terminal slots of two outer sides of the two rows of the terminal slots. The plurality of the conductive terminals are mounted in the insulating body. The plurality of the conductive terminals are fixed in middle terminal slots of the two rows of the terminal slots. The plurality of the grounding terminals are mounted in the insulating body. The plurality of the grounding terminals are fixed in the terminal slots of the two outer sides of the two rows of the terminal slots. The plurality of the conductive terminals and the plurality of the grounding terminals are arranged in two rows. The plurality of the grounding terminals are located adjacent to two outer sides of the plurality of the conductive terminals. The two shielding elements are disposed at a front end of an upper surface and a front end of a lower surface of the insulating body. Each shielding element has a base frame. Two sides of a rear edge of the base frame are connected with two contact portions. The contact portions of the two shielding elements pass through the penetrating grooves of the insulating body. The contact portions of the two shielding elements project into the terminal slots of the two outer sides of the two rows of the terminal slots. The contact portions of the two shielding elements contact with the plurality of the grounding terminals through the penetrating grooves of the insulating body.

Another object of the present invention is to provide an electrical connector. The electrical connector includes an insulating body, a plurality of conductive terminals, a plurality of grounding terminals and two shielding elements. A front end of the insulating body has an accommodating space penetrating through a front surface of the insulating body. A rear end of the insulating body has an assembling groove penetrating through a rear end of a top surface, a rear end of a bottom surface and a rear surface of the insulating body. The insulating body has an isolating wall formed between the accommodating space and the assembling groove. The isolating wall defines two rows of terminal slots along an up-down direction. Each terminal slot longitudinally penetrates through the isolating wall. The two rows of the terminal slots are communicated between the accommodating space and the assembling groove. Two sides of an upper portion of the insulating body have two penetrating grooves penetrating through two sides of the top surface of the insulating body, and extending vertically to two terminal slots of two outer sides of one row of the terminal slots. Two sides of a lower portion of the insulating body have the other two penetrating grooves penetrating through two sides of the bottom surface of the insulating body, and extending vertically to two terminal slots of two outer sides of the other row of the terminal slots. The plurality of the conductive terminals are mounted in the insulating body. The plurality of the conductive terminals are fixed in middle terminal slots of the two rows of the terminal slots. The plurality of the grounding terminals are mounted in the insulating body. The plurality of the grounding terminals are fixed in the terminal slots of the two outer sides of the two rows of the terminal slots. The plurality of the conductive terminals and the plurality of the grounding terminals are arranged in two rows. The plurality of the grounding terminals are located adjacent to two outer sides of the plurality of the conductive terminals. The two shielding elements are disposed at a front end of an upper surface and a front end of a lower surface of the insulating body. Each shielding element has a base frame. Two sides of a rear edge of the base frame of each shielding element extend rearward to form two extension portions. Two outer sides of two free ends of the two extension portions protrude towards the insulating body and are arched inward to form two contact portions. The contact portions of the two shielding elements pass through the penetrating grooves of the insulating body. The contact portions of the two shielding elements project into the terminal slots of the two outer sides of the two rows of the terminal slots. Each contact portion is in contact with an outer side surface of one grounding terminal. Each contact portion is connected with the outer side surface of the one grounding terminal.

Another object of the present invention is to provide an electrical connector. The electrical connector includes an insulating body, a plurality of conductive terminals, a plurality of grounding terminals and two shielding elements. A front end of the insulating body has an accommodating space penetrating through a front surface of the insulating body. A rear end of the insulating body has an assembling groove penetrating through a rear end of a top surface, a rear end of a bottom surface and a rear surface of the insulating body. The insulating body has an isolating wall formed between the accommodating space and the assembling groove. The isolating wall defines two rows of terminal slots along an up-down direction. Each terminal slot longitudinally penetrates through the isolating wall. The two rows of the terminal slots are communicated between the accommodating space and the assembling groove. Two sides of an upper portion of the insulating body have two penetrating grooves penetrating through two sides of the top surface of the insulating body, and vertically extending to two terminal slots of two outer sides of one row of the terminal slots, and the two penetrating grooves longitudinally extend to the assembling groove. Two sides of a lower portion of the insulating body have the other two penetrating grooves penetrating through two sides of the bottom surface of the insulating body, and vertically extending to two terminal slots of two outer sides of the other row of the terminal slots, and the other two penetrating grooves longitudinally extend to the assembling groove. The plurality of the conductive terminals are mounted in the insulating body. The plurality of the conductive terminals are fixed in middle terminal slots of the two rows of the terminal slots. The plurality of the grounding terminals are mounted in the insulating body. The plurality of the grounding terminals are fixed in the terminal slots of the two outer sides of the two rows of the terminal slots. The plurality of the conductive terminals and the plurality of the grounding terminals are arranged in two rows. The plurality of the grounding terminals are located adjacent to two outer sides of the plurality of the conductive terminals. The two shielding elements are disposed at a front end of an upper surface and a front end of a lower surface of the insulating body. Each shielding element has a base frame. Two sides of a rear edge of each shielding element extend rearward, then slantwise extend rearward and towards the insulating body, and are further arched towards the plurality of the grounding terminals to form two contact portions. The contact portions of the two shielding elements pass through the penetrating grooves of the insulating body. The contact portions of the two shielding elements project into the terminal slots of the two outer sides of the two rows of the terminal slots. Each contact portion faces towards an outer horizontal surface of one grounding terminal. Each contact portion is in contact with the outer horizontal surface of the one grounding terminal. Each contact portion is connected with the outer horizontal surface of the one grounding terminal.

As described above, the contact portions of the two shielding elements of the electrical connector contact with the plurality of the grounding terminals to improve a resonance effect of a resonance point of the electrical connector, so that a high frequency stability of the electrical connector is improved. Furthermore, the electrical connector is able to achieve a sufficient signal transmission speed and achieve a low signal interference effect simultaneously, so the electrical connector is able to stabilize a high frequency transmission.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
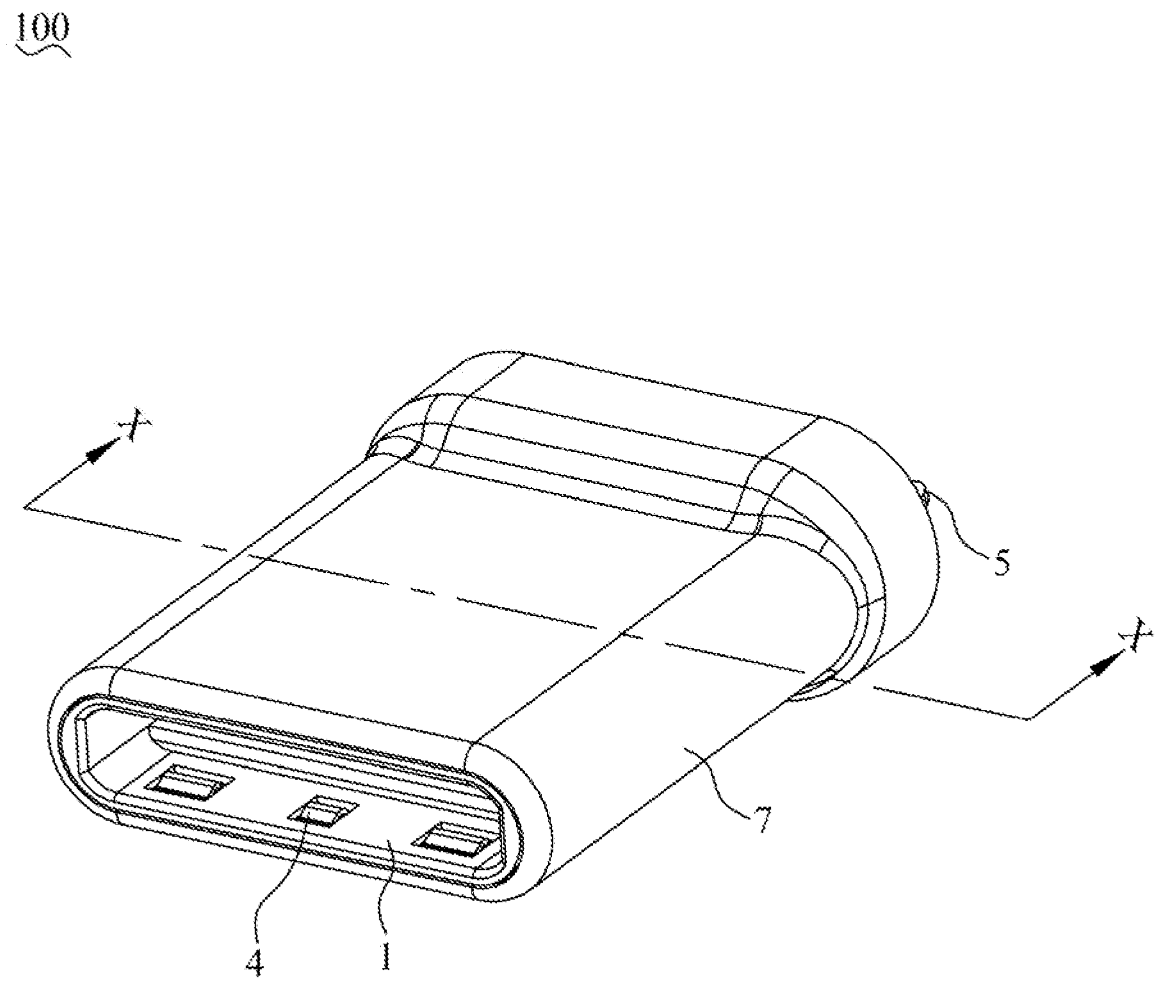
FIG. 1 is a perspective view of an electrical connector in accordance with a first preferred embodiment of the present invention.
Figure 2:
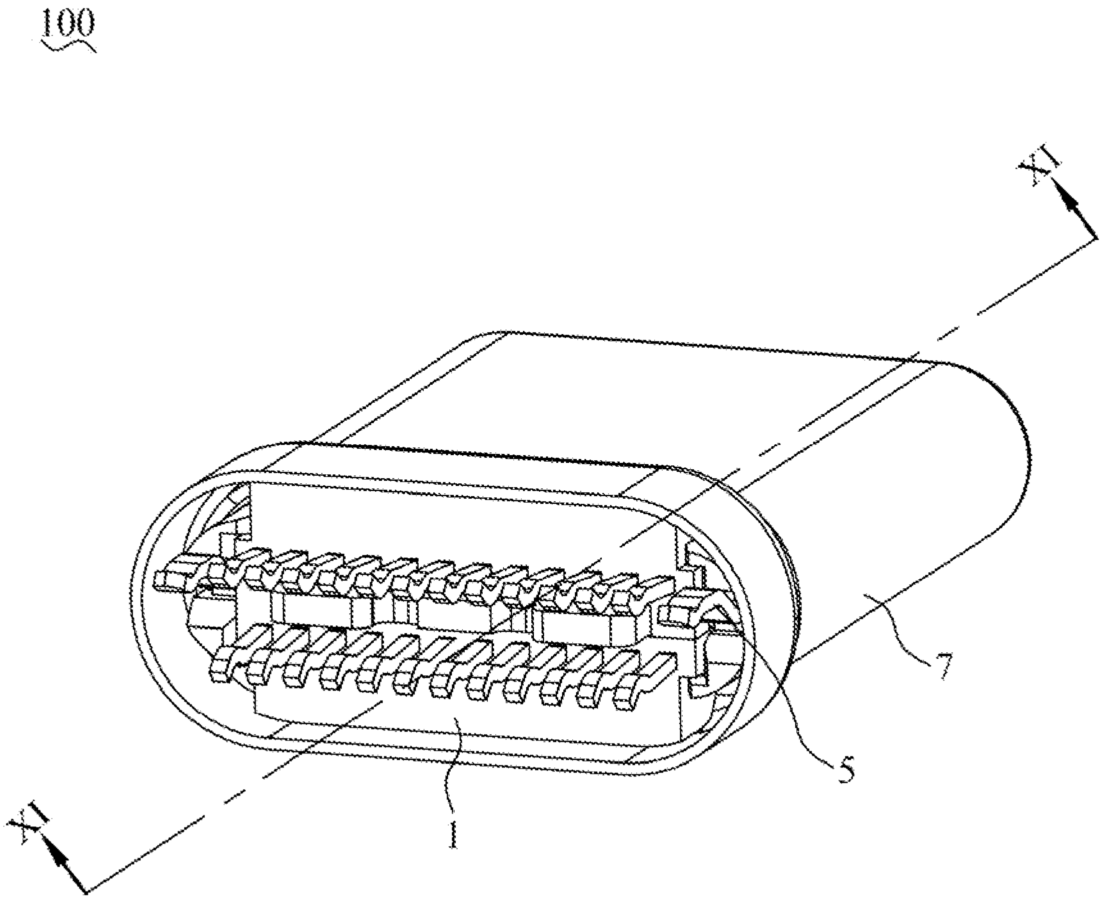
FIG. 2 is another perspective view of the electrical connector in accordance with a second preferred embodiment of the present invention.
Figure 3:
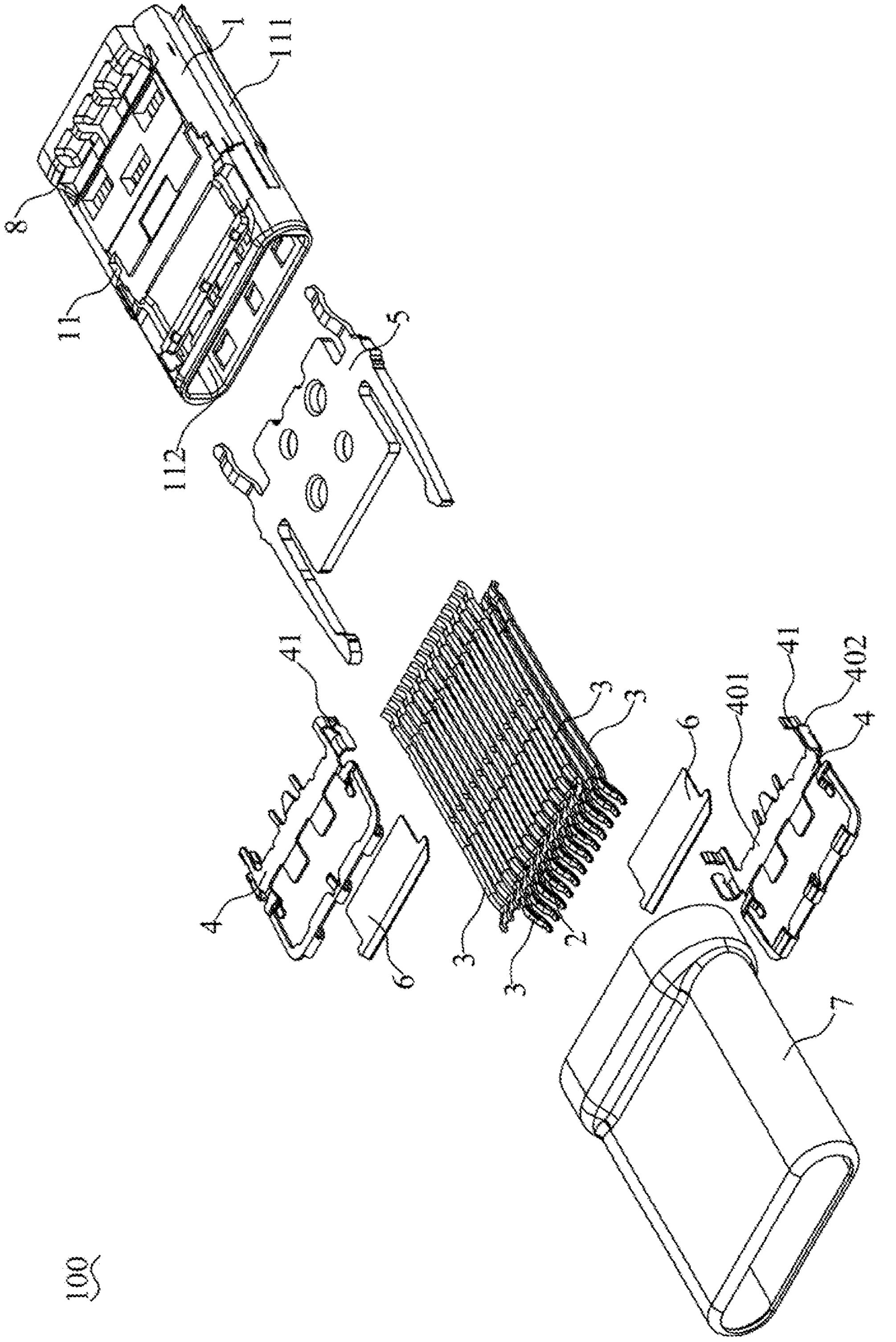
FIG. 3 is an exploded view of the electrical connector in accordance with the first preferred embodiment of the present invention.
Figure 4:
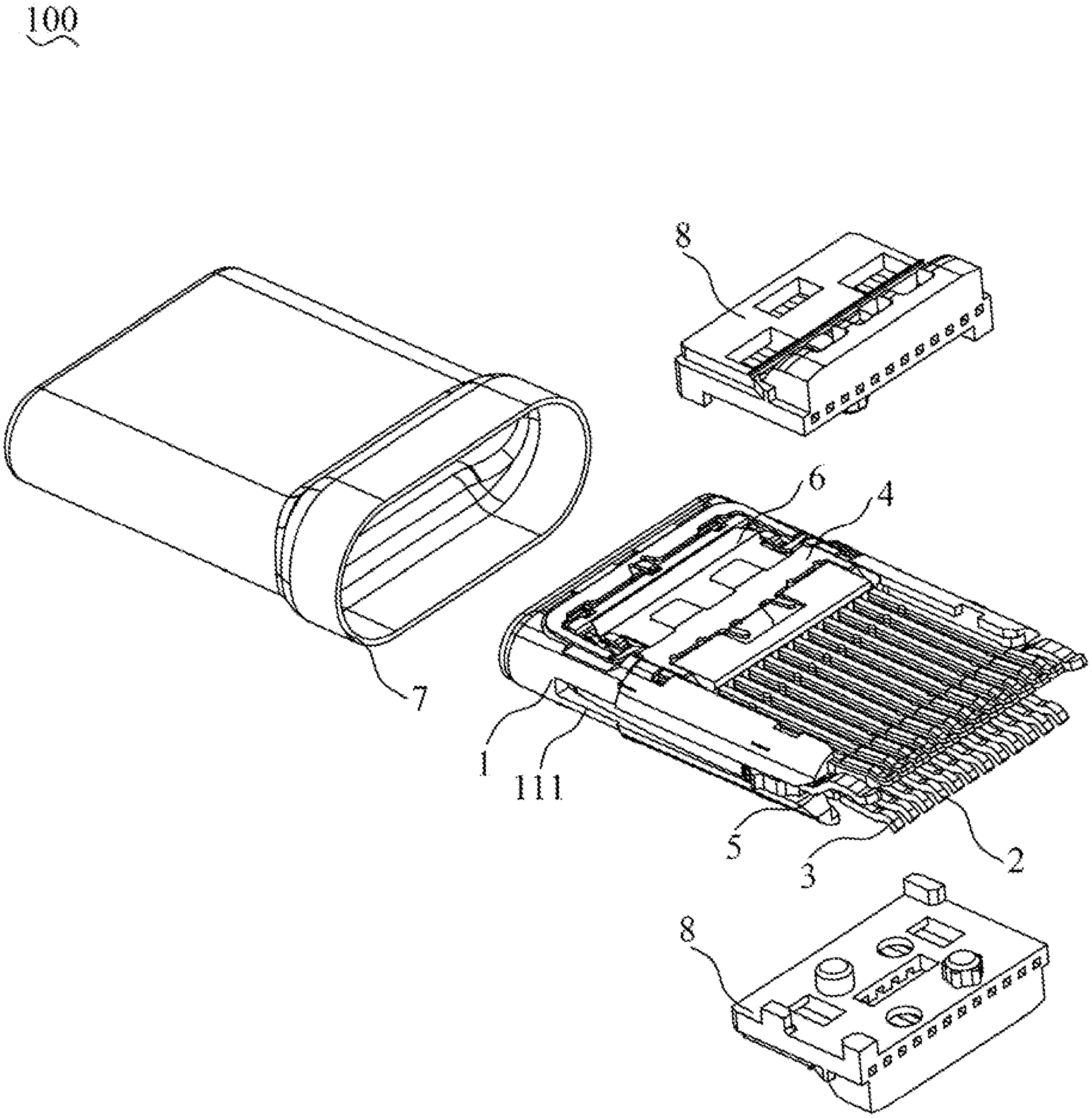
FIG. 4 is a partially exploded view of the electrical connector in accordance with the first preferred embodiment of the present invention.
Figure 5:
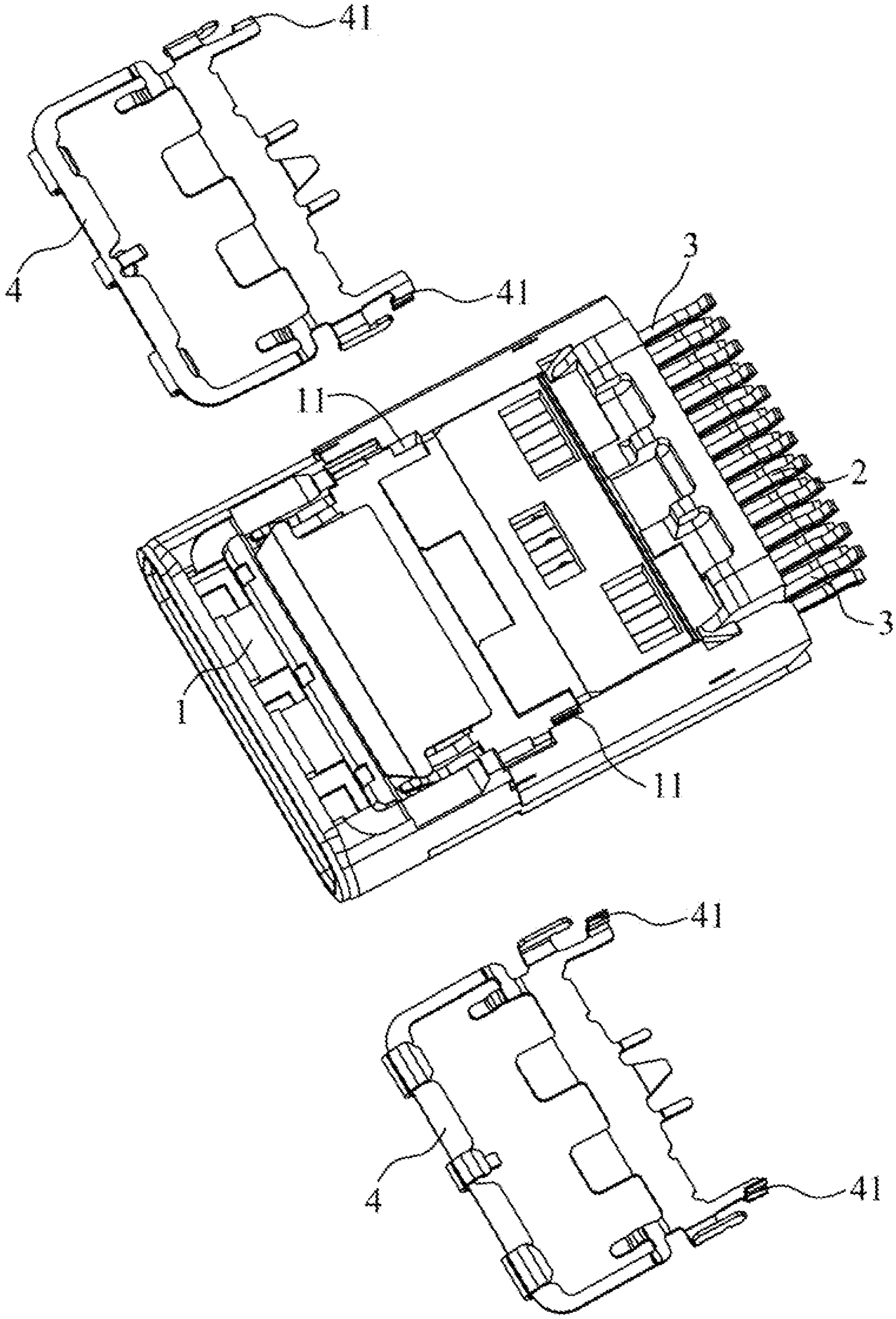
FIG. 5 is another partially exploded view of the electrical connector in accordance with the first preferred embodiment of the present invention.

With reference to FIG. 1 to FIG. 3, an electrical connector 100 in accordance with the present invention is shown. The electrical connector 100 includes an insulating body 1, a plurality of conductive terminals 2, a plurality of grounding terminals 3, two locating blocks 8, two shielding elements 4, a grounding element 5, two insulating pads 6 and a shell 7.

With reference to FIG. 2 to FIG. 7, two middles of two outer side surfaces of the insulating body 1 are recessed inward to form two clamping grooves 111. The two clamping grooves 111 extending longitudinally and penetrating through two sides of a rear surface of the insulating body 1. A front end of the insulating body 1 has an accommodating space 112 penetrating through a front surface of the insulating body 1. A rear end of the insulating body 1 has an assembling groove 113 penetrating through a rear end of a top surface, a rear end of a bottom surface and a middle of the rear surface of the insulating body 1. A front end of the top surface and a front end of the bottom surface of the insulating body 1 are recessed inward to form two receiving grooves 116. The insulating body 1 has an isolating wall 114 formed between the accommodating space 112 and the assembling groove 113. The isolating wall 114 defines two rows of terminal slots 115 along an up-down direction. Each terminal slot 115 longitudinally penetrates through the isolating wall 114. The two rows of the terminal slots 115 are communicated between the accommodating space 112 and the assembling groove 113. One row of the terminal slots 115 penetrate through a front end of an upper surface of the insulating body 1. The other row of the terminal slots 115 penetrate through a front end of a lower surface of the insulating body 1. A middle of a rear surface of the isolating wall 114 is recessed inward to form a fastening slot 117. The fastening slot 117 is formed between the two rows of the terminal slots 115.

Two sides of an upper portion of the insulating body 1 are recessed inward to form two insertion slots 12 extending to two tops of the two clamping grooves 111. Two sides of a lower portion of the insulating body 1 are recessed inward to form the other two insertion slots 12 extending to two bottoms of the two clamping grooves 111. The insertion slots 12 of the insulating body 1 are communicated with the two clamping grooves 111. The insulating body 1 have a plurality of penetrating grooves 11 respectively penetrating through two sides of the top surface and two sides of the bottom surface of the insulating body 1, and the plurality of the penetrating grooves 11 extend to the terminal slots 115 of two outer sides of the two rows of the terminal slots 115. The insertion slots 12 of the insulating body 1 are located in front of the penetrating grooves 11 of the insulating body 1.

With reference to FIG. 1 to FIG. 7, the plurality of the conductive terminals 2 and the plurality of the grounding terminals 3 are fastened in the two locating blocks 8. The two locating blocks 8, the plurality of the conductive terminals 2 and the plurality of the grounding terminals 3 are mounted in the insulating body 1. The two locating blocks 8 are assembled in the assembling groove 113. The two locating blocks 8 are corresponding to each other along the up-down direction. The plurality of the conductive terminals 2 and the grounding terminals 3 are fixed in the two rows of the terminal slots 115. The plurality of the conductive terminals 2 and the plurality of the grounding terminals 3 are arranged in two rows. The two rows of the conductive terminals 2 and the grounding terminals 3 are arranged along the up-down direction. One row of the conductive terminals 2 and the grounding terminals 3 are exposed to the front end of the upper surface of the insulating body 1 through the one row of the terminal slots 115. The other row of the conductive terminals 2 and the grounding terminals 3 are exposed to the front end of the lower surface of the insulating body 1 through the other row of the terminal slots 115.

The plurality of the conductive terminals 2 are fixed in middle terminal slots 115 of the two rows of the terminal slots 115. The plurality of the grounding terminals 3 are fixed in the terminal slots 115 of the two outer sides of the two rows of the terminal slots 115. The plurality of the conductive terminals 2 and the grounding terminals 3 are spaced from one another. The plurality of the grounding terminals 3 are located adjacent to two outer sides of the plurality of the conductive terminals 2. Specifically, the electrical connector 100 includes four grounding terminals 3 arranged in the two rows of the conductive terminals 2 and the grounding terminals 3. The four grounding terminals 3 are located to the two outer sides of the plurality of the conductive terminals 2. In each row, the plurality of the conductive terminals 2 are located between two grounding terminals 3.

Figure 6:
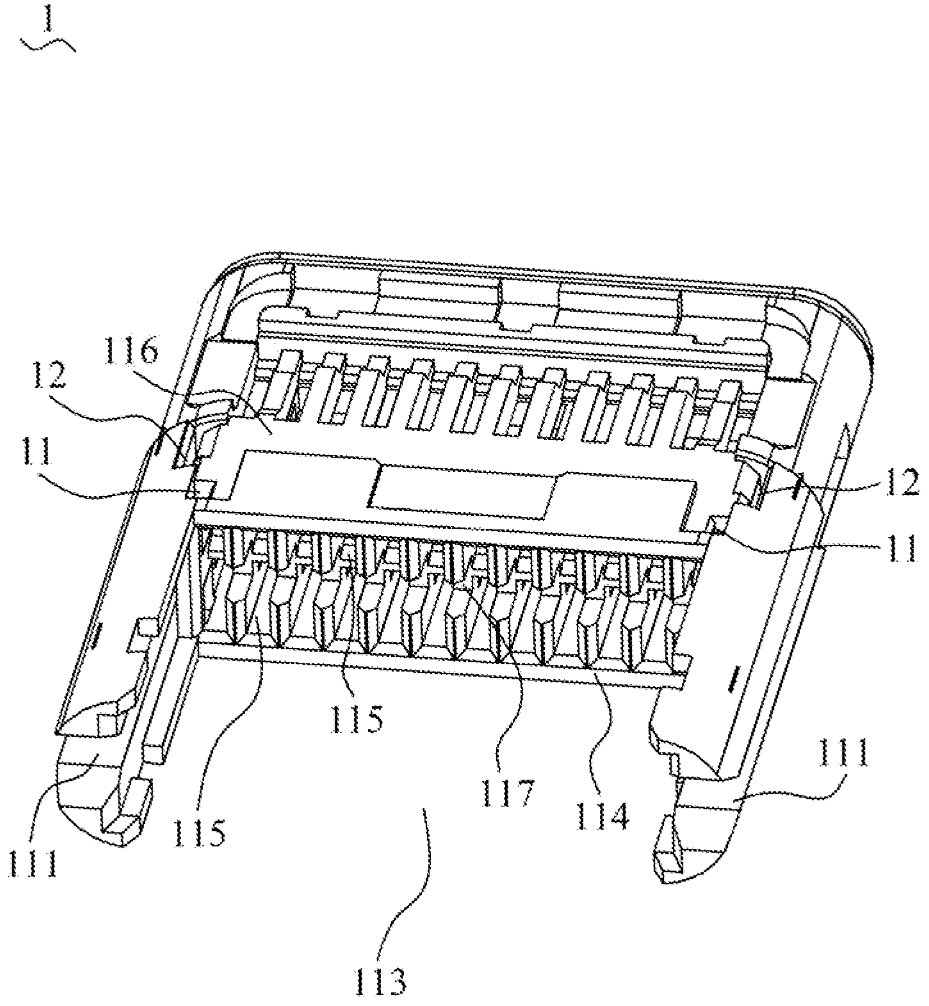
FIG. 6 is a perspective view of an insulating body of the electrical connector in accordance with the first preferred embodiment of the present invention.
Figure 7:
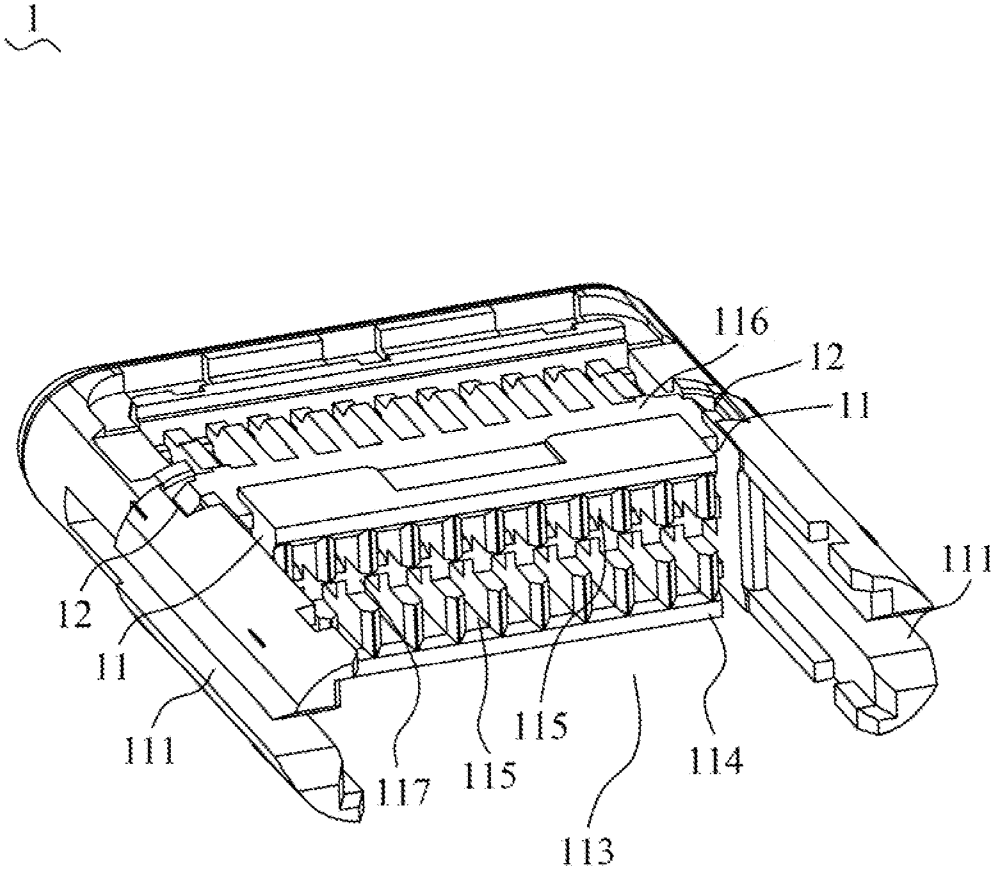
FIG. 7 is a perspective view of the insulating body of the electrical connector in accordance with the second preferred embodiment of the present invention.
Figure 8:
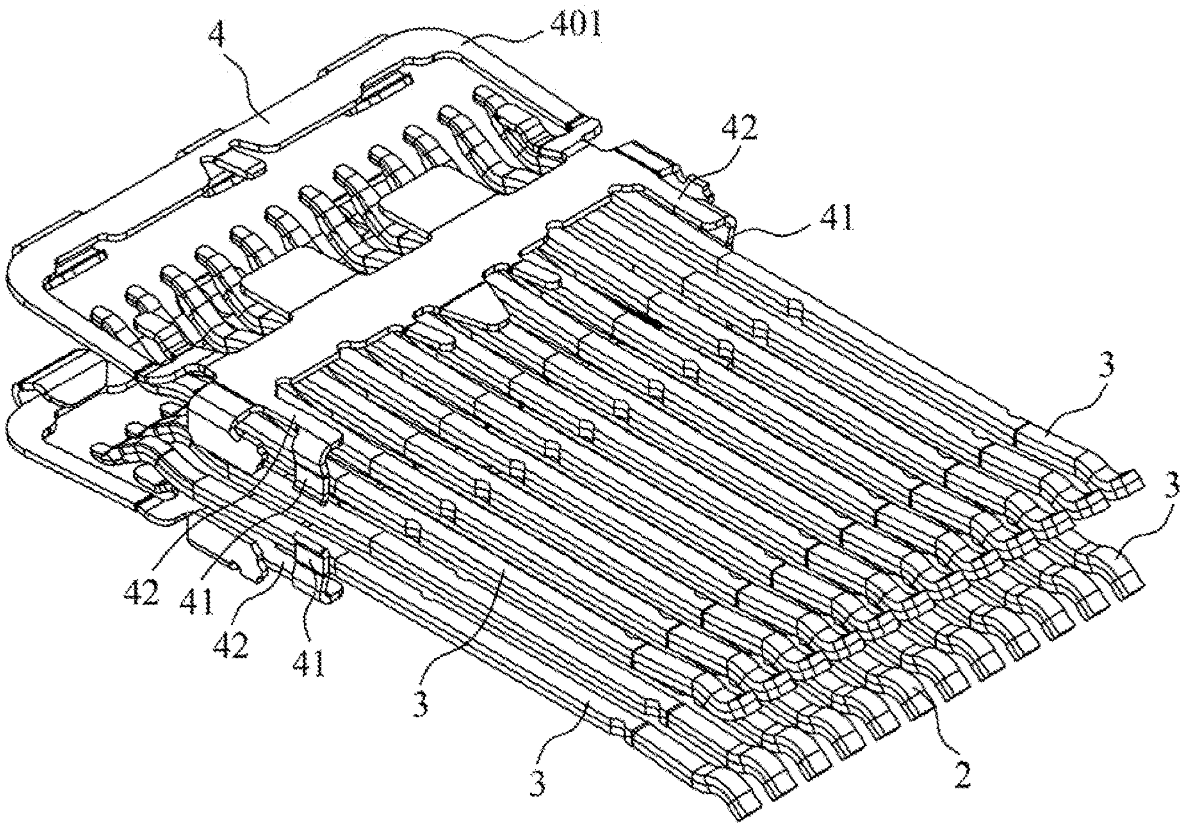
FIG. 8 is a partially assembled view of the electrical connector in accordance with the first preferred embodiment of the present invention.
Figure 9:
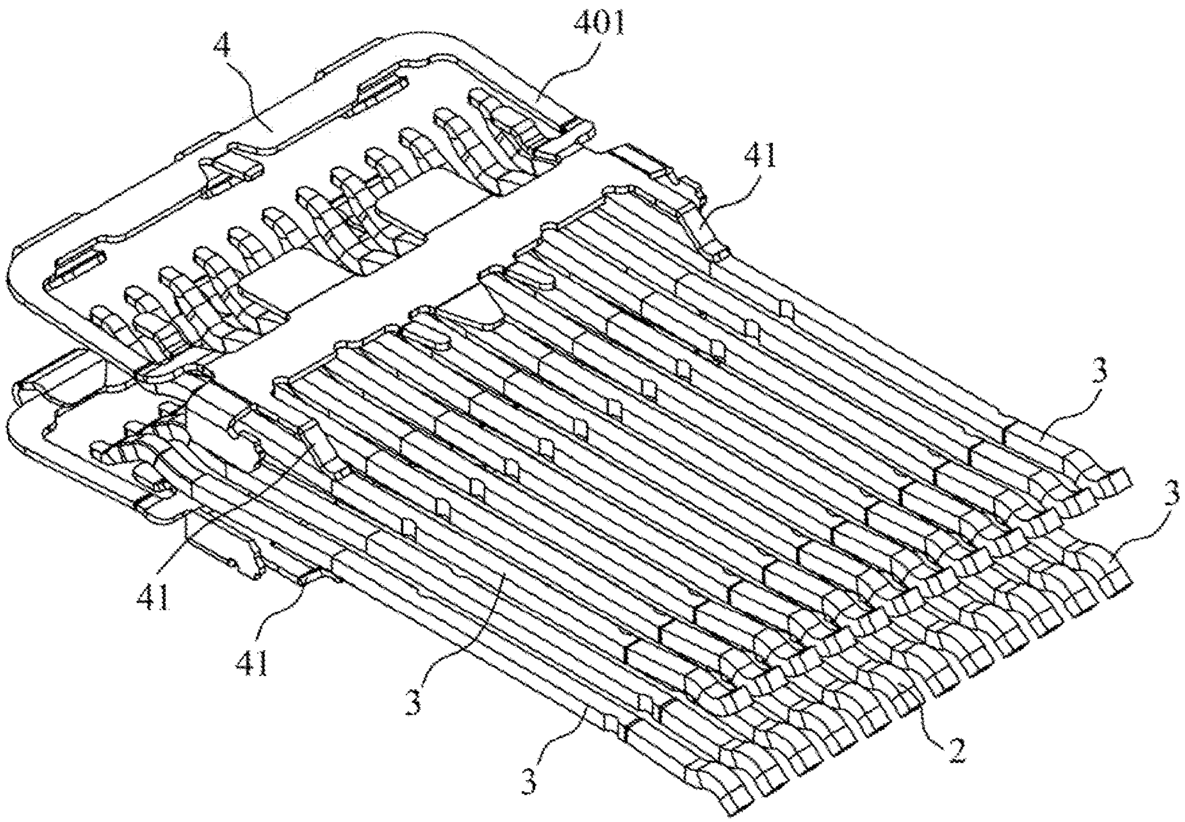
FIG. 9 is a partially assembled view of the electrical connector in accordance with the second preferred embodiment of the present invention.
Figure 10:
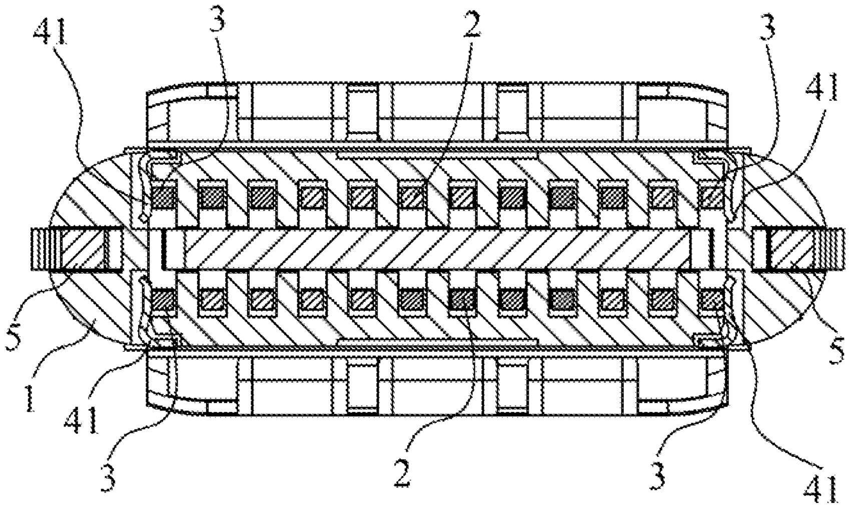
FIG. 10 is a sectional view of the electrical connector along a line X-X of FIG. 1.
Figure 11:
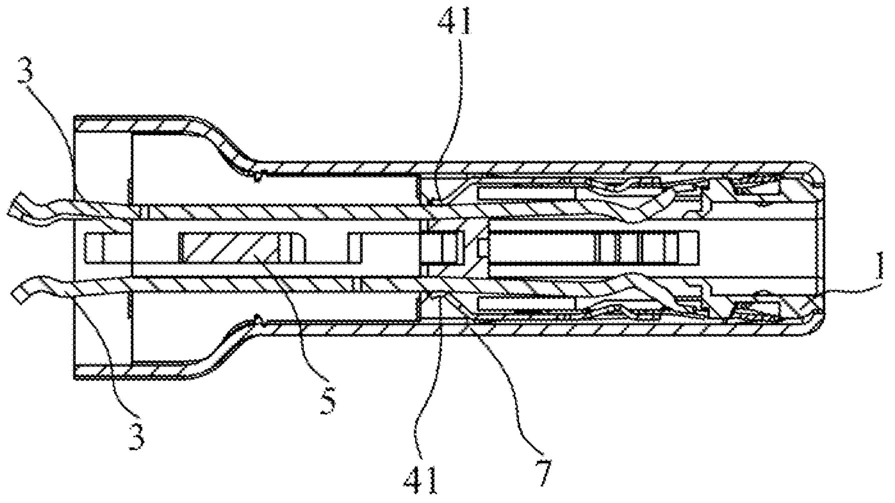
FIG. 11 is a sectional view of the electrical connector along a line XI-XI of FIG. 2.

With reference to FIG. 3, FIG. 6 and FIG. 7, the grounding element 5 is fastened in the fastening slot 117. The grounding element 5 is arranged between the two rows of the conductive terminals 2 and the grounding terminals 3. Two opposite sides of the grounding element 5 project into the two clamping grooves 111. The two opposite sides of the grounding element 5 are exposed outside from the two clamping grooves 111. When the electrical connector 100 is connected with a docking connector (not shown), the grounding element 5 is able to keep the electrical connector 100 and the docking connector in a grounded state so as to stabilize a current transmission.

The two insulating pads 6 are mounted at the front end of the upper surface and the front end of the lower surface of the insulating body 1. The grounding element 5 is located between the two insulating pads 6. The two insulating pads 6 contact with outer horizontal surfaces of the plurality of the conductive terminals 2 and the grounding terminals 3. The outer horizontal surfaces of the plurality of the conductive terminals 2 and the grounding terminals 3 are opposite to the grounding element 5. The two insulating pads 6 are mounted in the two receiving grooves 116, respectively. A material of each insulating pad 6 is Mylar. When the electrical connector 100 is inserted into or withdrawn from the docking connector, the two insulating pads 6 are able to prevent the outer surfaces of the plurality of the conductive terminals 2 and the grounding terminals 3 from contacting the shell 7 which is made of metal to cause a short circuit, so that the electrical connector 100 maintains a normal use.

With reference to FIG. 1 to FIG. 7, the two shielding elements 4 are disposed at the front end of the upper surface and the front end of the lower surface of the insulating body 1. The two shielding elements 4 are received in the two receiving grooves 116, respectively. The two shielding elements 4 are covered to the two insulating pads 6, respectively. One shielding element 4 is located above the two rows of the conductive terminals 2 and the grounding terminals 3, and the other shielding element 4 is located below the two rows of the conductive terminals 2 and the grounding terminals 3.

Each shielding element 4 has a rectangular base frame 401. Two rear ends of two sides of the base frame 401 are bent towards the insulating body 1 and then extend rearward to form two bending portions 402. The bending portions 402 of the two shielding elements 4 are inserted into the insertion slots 12 of the insulating body 1. Two sides of a rear edge of the base frame 401 are connected with two contact portions 41. The contact portions 41 of the two shielding elements 4 pass through the penetrating grooves 11 of the insulating body 1. The contact portions 41 of the two shielding elements 4 project into the terminal slots 115 of the two outer sides of the two rows of the terminal slots 115. The contact portions 41 of the two shielding elements 4 contact with the plurality of the grounding terminals 3 through the penetrating grooves 11 of the insulating body 1. Because in a high frequency band, the electrical connector 100 generates a resonance point, the resonance point affects a transmission stability of each conductive terminal 2. The two shielding elements 4 contact with the plurality of the grounding terminals 3 to improve a resonance effect of the resonance point of the electrical connector 100, so that a high frequency stability of the electrical connector 100 is improved.

With reference to FIG. 1, FIG. 3, FIG. 4, FIG. 5, FIG. 6, FIG. 8 and FIG. 10, in the first preferred embodiment, the two sides of the upper portion of the insulating body 1 have two penetrating grooves 11 penetrating through the two sides of the top surface of the insulating body 1, and extending vertically to two terminal slots 115 of two outer sides of the one row of the terminal slots 115. The two sides of the lower portion of the insulating body 1 have the other two penetrating grooves 11 penetrating through the two sides of the bottom surface of the insulating body 1, and extending vertically to two terminal slots 115 of two outer sides of the other row of the terminal slots 115. The two penetrating grooves 11 of the upper portion of the insulating body 1 are communicated with the two terminal slots 115 of the two outer sides of the one row of the terminal slots 115. The two penetrating grooves 11 of the lower portion of the insulating body 1 are communicated with the two terminal slots 115 of the two outer sides of the other row of the terminal slots 115.

Each shielding element 4 has two extension portions 42. The two extension portions 42 are connected between the two contact portions 41 and the two sides of the rear edge of the base frame 401. The two sides of the rear edge of the base frame 401 of each shielding element 4 extend rearward to form the two extension portions 42. Two outer sides of two free ends of the two extension portions 42 protrude towards the insulating body 1 and are arched inward to form the two contact portions 41. The contact portions 41 of the two shielding elements 4 pass through the penetrating grooves 11 of the insulating body 1. The contact portions 41 of the two shielding elements 4 project into the terminal slots 115 of the two outer sides of the two rows of the terminal slots 115. Each contact portion 41 is in contact with an outer side surface of one grounding terminal 3. Each contact portion 41 is connected with the outer side surface of the one grounding terminal 3.

With reference to FIG. 1 to FIG. 11, in the second preferred embodiment, the two sides of the upper portion of the insulating body 1 have the two penetrating grooves 11 penetrating through the two sides of the top surface of the insulating body 1, and vertically extending to the two terminal slots 115 of the two outer sides of the one row of the terminal slots 115, and the two penetrating grooves 11 longitudinally extend to the assembling groove 113. The two sides of the lower portion of the insulating body 1 have the other two penetrating grooves 11 penetrating through the two sides of the bottom surface of the insulating body 1, and vertically extending to the two terminal slots 115 of the two outer sides of the other row of the terminal slots 115, and the other two penetrating grooves 11 longitudinally extend to the assembling groove 113. The two penetrating grooves 11 of the upper portion of the insulating body 1 are communicated with the assembling groove 113 and the two terminal slots 115 of the two outer sides of the one row of the terminal slots 115. The two penetrating grooves 11 of the lower portion of the insulating body 1 are communicated with the assembling groove 113 and the two terminal slots 115 of the two outer sides of the other row of the terminal slots 115.

The two sides of the rear edge of each shielding element 4 extend rearward, then slantwise extend rearward and towards the insulating body 1, and are further arched towards the plurality of the grounding terminals 3 to form the two contact portions 41. The contact portions 41 of the two shielding elements 4 pass through the penetrating grooves 11 of the insulating body 1. The contact portions 41 of the two shielding elements 4 project into the terminal slots 115 of the two outer sides of the two rows of the terminal slots 115. Each contact portion 41 faces towards the outer horizontal surface of the one grounding terminal 3. The outer horizontal surface of the one grounding terminal 3 is opposite to the grounding element 5. Each contact portion 41 is in contact with the outer horizontal surface of the one grounding terminal 3 which is opposite to the grounding element 5. Each contact portion 41 is connected with the outer horizontal surface of the one grounding terminal 3 which is opposite to the grounding element 5.

Referring to FIG. 1 to FIG. 11, in the first preferred embodiment and the second preferred embodiment, the shell 7 surrounds the insulating body 1, the plurality of the conductive terminals 2, the plurality of the grounding terminals 3, the two shielding elements 4, the grounding element 5 and the two insulating pads 6.

As described above, the contact portions 41 of the two shielding elements 4 of the electrical connector 100 contact with the plurality of the grounding terminals 3 to improve the resonance effect of the resonance point of the electrical connector 100, so that the high frequency stability of the electrical connector 100 is improved. Furthermore, the electrical connector 100 is able to achieve a sufficient signal transmission speed and achieve a low signal interference effect simultaneously, so the electrical connector 100 is able to stabilize a high frequency transmission.

What is claimed is:

1. An electrical connector, comprising:

an insulating body, a front end of the insulating body having an accommodating space penetrating through a front surface of the insulating body, a rear end of the insulating body having an assembling groove penetrating through a rear end of a top surface, a rear end of a bottom surface and a middle of a rear surface of the insulating body, the insulating body having an isolating wall formed between the accommodating space and the assembling groove, the isolating wall defining two rows of terminal slots along an up-down direction, each terminal slot longitudinally penetrating through the isolating wall, the two rows of the terminal slots being communicated between the accommodating space and the assembling groove, the insulating body having a plurality of penetrating grooves respectively penetrating through two sides of the top surface and two sides of the bottom surface of the insulating body, and the plurality of the penetrating grooves extending to the terminal slots of two outer sides of the two rows of the terminal slots;

a plurality of conductive terminals mounted in the insulating body, the plurality of the conductive terminals being fixed in middle terminal slots of the two rows of the terminal slots;

a plurality of grounding terminals mounted in the insulating body, the plurality of the grounding terminals being fixed in the terminal slots of the two outer sides of the two rows of the terminal slots, the plurality of the conductive terminals and the plurality of the grounding terminals being arranged in two rows, the plurality of the grounding terminals being located adjacent to two outer sides of the plurality of the conductive terminals; and two shielding elements disposed at a front end of an upper surface and a front end of a lower surface of the insulating body, each shielding element having a base frame, two sides of a rear edge of the base frame being connected with two contact portions, the contact portions of the two shielding elements passing through the penetrating grooves of the insulating body, the contact portions of the two shielding elements projecting into the terminal slots of the two outer sides of the two rows of the terminal slots, the contact portions of the two shielding elements contacting with the plurality of the grounding terminals through the penetrating grooves of the insulating body.

2. The electrical connector as claimed in claim 1, wherein the two sides of the rear edge of the base frame of each shielding element extend rearward to form two extension portions, two outer sides of two free ends of the two extension portions protrude towards the insulating body and are arched inward to form the two contact portions, the contact portions of the two shielding elements pass through the penetrating grooves of the insulating body, the contact portions of the two shielding elements project into the terminal slots of the two outer sides of the two rows of the terminal slots, each contact portion is in contact with an outer side surface of one grounding terminal, each contact portion is connected with the outer side surface of the one grounding terminal.

3. The electrical connector as claimed in claim 2, wherein the two extension portions are connected between the two contact portions and the two sides of the rear edge of the base frame.

4. The electrical connector as claimed in claim 1, wherein the two sides of the rear edge of each shielding element extend rearward, then slantwise extend rearward and towards the insulating body, and are further arched towards the plurality of the grounding terminals to form the two contact portions, the contact portions of the two shielding elements pass through the penetrating grooves of the insulating body, the contact portions of the two shielding elements project into the terminal slots of the two outer sides of the two rows of the terminal slots, each contact portion faces towards an outer horizontal surface of one grounding terminal, each contact portion is in contact with the outer horizontal surface of the one grounding terminal, each contact portion is connected with the outer horizontal surface of the one grounding terminal.

5. The electrical connector as claimed in claim 1, wherein two sides of an upper portion of the insulating body are recessed inward to form two insertion slots, two sides of a lower portion of the insulating body are recessed inward to form the other two insertion slots, two rear ends of two sides of the base frame are bent towards the insulating body and then extend rearward to form two bending portions, the bending portions of the two shielding elements are inserted into the insertion slots of the insulating body.

6. The electrical connector as claimed in claim 5, wherein the insertion slots of the insulating body are located in front of the penetrating grooves of the insulating body.

7. The electrical connector as claimed in claim 1, wherein two sides of an upper portion of the insulating body have two penetrating grooves penetrating through the two sides of the top surface of the insulating body, and extending vertically to two terminal slots of two outer sides of one row of the terminal slots, two sides of a lower portion of the insulating body have the other two penetrating grooves penetrating through the two sides of the bottom surface of the insulating body, and extending vertically to two terminal slots of two outer sides of the other row of the terminal slots, the two penetrating grooves of the upper portion of the insulating body are communicated with the two terminal slots of the two outer sides of the one row of the terminal slots, the two penetrating grooves of the lower portion of the insulating body are communicated with the two terminal slots of the two outer sides of the other row of the terminal slots.

8. The electrical connector as claimed in claim 1, wherein two sides of an upper portion of the insulating body have two penetrating grooves penetrating through the two sides of the top surface of the insulating body, and vertically extending to two terminal slots of two outer sides of one row of the terminal slots, and the two penetrating grooves longitudinally extend to the assembling groove, two sides of a lower portion of the insulating body have the other two penetrating grooves penetrating through the two sides of the bottom surface of the insulating body, and vertically extending to two terminal slots of two outer sides of the other row of the terminal slots, and the other two penetrating grooves longitudinally extend to the assembling groove, the two penetrating grooves of the upper portion of the insulating body are communicated with the assembling groove and the two terminal slots of the two outer sides of the one row of the terminal slots, the two penetrating grooves of the lower portion of the insulating body are communicated with the assembling groove and the two terminal slots of the two outer sides of the other row of the terminal slots.

9. The electrical connector as claimed in claim 1, wherein the electrical connector includes four grounding terminals arranged in the two rows of the conductive terminals and the grounding terminals, the four grounding terminals are located to two outer sides of the plurality of the conductive terminals, in each row, the plurality of the conductive terminals are located between two grounding terminals, one shielding element is located above the two rows of the conductive terminals and the grounding terminals, and the other shielding element is located below the two rows of the conductive terminals and the grounding terminals.

10. The electrical connector as claimed in claim 1, wherein a front end of the top surface and a front end of the bottom surface of the insulating body are recessed inward to form two receiving grooves, the two shielding elements are received in the two receiving grooves, respectively.

11. The electrical connector as claimed in claim 1, wherein a middle of a rear surface of the isolating wall is recessed inward to form a fastening slot, the fastening slot is formed between the two rows of the terminal slots, the electrical connector further includes a grounding element, the grounding element is fastened in the fastening slot, the grounding element is arranged between the two rows of the conductive terminals and the grounding terminals.

12. The electrical connector as claimed in claim 11, wherein a front end of the top surface and a front end of the bottom surface of the insulating body are recessed inward to form two receiving grooves, the electrical connector further includes two insulating pads, the two insulating pads are mounted in the two receiving grooves, respectively, the two insulating pads contact with outer horizontal surfaces of the plurality of the conductive terminals and the grounding terminals, the outer horizontal surfaces of the plurality of the conductive terminals and the grounding terminals are opposite to the grounding element, the two shielding elements are covered to the two insulating pads, respectively.

13. The electrical connector as claimed in claim 12, further comprising two locating blocks, the plurality of the conductive terminals and the plurality of the grounding terminals being fastened in the two locating blocks, the two locating blocks being assembled in the assembling groove, the two locating blocks being corresponding to each other along the up-down direction.

14. The electrical connector as claimed in claim 1, further comprising a shell surrounding the insulating body, the plurality of the conductive terminals, the plurality of the grounding terminals, the two shielding elements, the grounding element and the two insulating pads.

15. An electrical connector, comprising:

an insulating body, a front end of the insulating body having an accommodating space penetrating through a front surface of the insulating body, a rear end of the insulating body having an assembling groove penetrating through a rear end of a top surface, a rear end of a bottom surface and a rear surface of the insulating body, the insulating body having an isolating wall formed between the accommodating space and the assembling groove, the isolating wall defining two rows of terminal slots along an up-down direction, each terminal slot longitudinally penetrating through the isolating wall, the two rows of the terminal slots being communicated between the accommodating space and the assembling groove, two sides of an upper portion of the insulating body having two penetrating grooves penetrating through two sides of the top surface of the insulating body, and extending vertically to two terminal slots of two outer sides of one row of the terminal slots, two sides of a lower portion of the insulating body having the other two penetrating grooves penetrating through two sides of the bottom surface of the insulating body, and extending vertically to two terminal slots of two outer sides of the other row of the terminal slots;

a plurality of conductive terminals mounted in the insulating body, the plurality of the conductive terminals being fixed in middle terminal slots of the two rows of the terminal slots;

a plurality of grounding terminals mounted in the insulating body, the plurality of the grounding terminals being fixed in the terminal slots of the two outer sides of the two rows of the terminal slots, the plurality of the conductive terminals and the plurality of the grounding terminals being arranged in two rows, the plurality of the grounding terminals being located adjacent to two outer sides of the plurality of the conductive terminals; and two shielding elements disposed at a front end of an upper surface and a front end of a lower surface of the insulating body, each shielding element having a base frame, two sides of a rear edge of the base frame of each shielding element extending rearward to form two extension portions, two outer sides of two free ends of the two extension portions protruding towards the insulating body and being arched inward to form two contact portions, the contact portions of the two shielding elements passing through the penetrating grooves of the insulating body, the contact portions of the two shielding elements projecting into the terminal slots of the two outer sides of the two rows of the terminal slots, each contact portion being in contact with an outer side surface of one grounding terminal, each contact portion being connected with the outer side surface of the one grounding terminal.

16. An electrical connector, comprising:

an insulating body, a front end of the insulating body having an accommodating space penetrating through a front surface of the insulating body, a rear end of the insulating body having an assembling groove penetrating through a rear end of a top surface, a rear end of a bottom surface and a rear surface of the insulating body, the insulating body having an isolating wall formed between the accommodating space and the assembling groove, the isolating wall defining two rows of terminal slots along an up-down direction, each terminal slot longitudinally penetrating through the isolating wall, the two rows of the terminal slots being communicated between the accommodating space and the assembling groove, two sides of an upper portion of the insulating body having two penetrating grooves penetrating through two sides of the top surface of the insulating body, and vertically extending to two terminal slots of two outer sides of one row of the terminal slots, and the two penetrating grooves longitudinally extending to the assembling groove, two sides of a lower portion of the insulating body having the other two penetrating grooves penetrating through two sides of the bottom surface of the insulating body, and vertically extending to two terminal slots of two outer sides of the other row of the terminal slots, and the other two penetrating grooves longitudinally extending to the assembling groove;

a plurality of conductive terminals mounted in the insulating body, the plurality of the conductive terminals being fixed in middle terminal slots of the two rows of the terminal slots;

a plurality of grounding terminals mounted in the insulating body, the plurality of the grounding terminals being fixed in the terminal slots of the two outer sides of the two rows of the terminal slots, the plurality of the conductive terminals and the plurality of the grounding terminals being arranged in two rows, the plurality of the grounding terminals being located adjacent to two outer sides of the plurality of the conductive terminals; and two shielding elements disposed at a front end of an upper surface and a front end of a lower surface of the insulating body, each shielding element having a base frame, two sides of a rear edge of each shielding element extending rearward, then slantwise extending rearward and towards the insulating body, and being further arched towards the plurality of the grounding terminals to form two contact portions, the contact portions of the two shielding elements passing through the penetrating grooves of the insulating body, the contact portions of the two shielding elements projecting into the terminal slots of the two outer sides of the two rows of the terminal slots, each contact portion facing towards an outer horizontal surface of one grounding terminal, each contact portion being in contact with the outer horizontal surface of the one grounding terminal, each contact portion being connected with the outer horizontal surface of the one grounding terminal.

* * * * *